US008514746B1

(12) United States Patent
Goli et al.

(10) Patent No.: US 8,514,746 B1
(45) Date of Patent: Aug. 20, 2013

(54) PRIORITY INVERSION WITH SPANNING TREE PROTOCOL TO TRIGGER PATH SWITCHING

(75) Inventors: Sri Goli, San Jose, CA (US); Ramanarayanan Ramakrishnan, San Jose, CA (US); Deepak Ojha, Rajasthan (IN); Apurva Mehta, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 338 days.

(21) Appl. No.: 12/941,692

(22) Filed: Nov. 8, 2010

(51) Int. Cl.
*H04L 12/28* (2006.01)

(52) U.S. Cl.
USPC .............................. 370/256; 370/216; 370/248

(58) Field of Classification Search
None
See application file for complete search history.

(56) References Cited

U.S. PATENT DOCUMENTS

| | | | | |
|---|---|---|---|---|
| 7,065,573 B2* | 6/2006 | Byrnes | | 709/224 |
| 7,110,367 B2* | 9/2006 | Moriya | | 370/256 |
| 7,283,465 B2* | 10/2007 | Zelig et al. | | 370/219 |
| 7,508,774 B2* | 3/2009 | Regan et al. | | 370/256 |
| 7,564,858 B1* | 7/2009 | Moncada-Elias et al. | | 370/402 |
| 7,706,292 B2* | 4/2010 | Nakano et al. | | 370/247 |
| 7,782,763 B2* | 8/2010 | Balus et al. | | 370/218 |
| 7,848,264 B1* | 12/2010 | Gai et al. | | 370/256 |
| 8,166,151 B2* | 4/2012 | Tsillas | | 709/224 |
| 8,300,523 B2* | 10/2012 | Salam et al. | | 370/220 |
| 2002/0159398 A1* | 10/2002 | Yamada et al. | | 370/256 |
| 2004/0133619 A1* | 7/2004 | Zelig et al. | | 709/200 |
| 2004/0252634 A1* | 12/2004 | Regan et al. | | 370/216 |
| 2005/0138008 A1* | 6/2005 | Tsillas | | 707/3 |
| 2007/0263554 A1* | 11/2007 | Finn | | 370/256 |
| 2008/0117829 A1* | 5/2008 | Nakano et al. | | 370/247 |
| 2008/0225695 A1* | 9/2008 | Balus et al. | | 370/216 |
| 2008/0240129 A1* | 10/2008 | Elmeleegy et al. | | 370/401 |
| 2010/0020680 A1* | 1/2010 | Salam et al. | | 370/225 |

OTHER PUBLICATIONS

IEEE, "IEEE Standard for Local and metropolitan area networks—Virtual Bridged Local Area Networks", Amendment 7: Provider Backbone Bridges, IEEE Computer Society, Aug. 14, 2008, 121pages.

* cited by examiner

*Primary Examiner* — Andrew Chriss
*Assistant Examiner* — John Lequang
(74) *Attorney, Agent, or Firm* — Harrity & Harrity, LLP

(57) ABSTRACT

The reliability of the connection of a client edge (CE) device to a core network may be improved using redundant provider edge (PE) devices. A first of the PE devices may monitor a connection to the core network, where the PE device acts as a root device in a set of devices that implement a spanning tree using a spanning tree protocol and where a second PE device in the set of devices additionally connects to the core network. The PE device may additionally detect failure of the connection of the PE device to the core network; and change, in response to the detected failure of the connection, a spanning tree protocol priority value of the device to a value having a lower priority than that of the second PE device.

22 Claims, 6 Drawing Sheets

PRIORITY INVERSION WITH SPANNING TREE PROTOCOL TO TRIGGER PATH SWITCHING

BACKGROUND

Backbone networks, which may also be called core networks, include networks designed to provide a path for the exchange of information between different local area networks (LANs) or subnetworks. A core network can tie together diverse networks in the same building, in different buildings in a campus environment, or over wide areas. Typically, a core network is a higher bandwidth network than the LANs or subnets that it connects.

As an example of a core network, a large corporation that has many locations may have a core network that ties all of the locations together. As another example, a service provider may maintain a core network that may be leased by customers.

Core networks may be particularly used as a provider bridge network (PBN). In such an implementation, two or more LANs or subnetworks may be connected over a core network in which the core network acts as a bridge. One standard for implementing provider bridge networks is the IEEE standard 802.1ah.

In a PBN, it may be desirable to provide redundant connections from a LAN/subnetwork to the PBN. For example, a customer edge (CE) device in the access network (i.e., the LAN or subnetwork that connects to the core network) may connect to two or more provide edge (PE) devices in the core network.

Other types of core networks include a provider backbone bridge network (PBBN) and a virtual private LAN service (VPLS). With these networks, as with a PBN, it may be similarly desirable to provide redundant connections from the LAN/subnetwork to the PBBN or VPLS core network.

SUMMARY

One implementation is directed to a device implemented method that may include monitoring a connection to a core network, the device acting as a root device in a set of devices that implement a spanning tree using a spanning tree protocol, where a second device in the set of devices additionally connects to the core network. The method may further include detecting a failure of the connection of the device to the core network; and changing, by the device and in response to the detected failure of the connection, a spanning tree protocol priority value of the device to a value having a lower priority than that of the second device, where changing the priority value causes, by operation of the spanning tree protocol, the second device to act as the root device in the spanning tree, so that data communicated with the core network is communicated through the second device.

In another implementation, a device may include: a number of ports, at least a first of the ports connecting to a core network and a second of the ports connecting to a set of devices that implement a spanning tree using a spanning tree protocol. The device may be a root device in the set of devices that implement the spanning tree. The device may further include a memory to store a spanning tree protocol priority value for the device and logic to: monitor a connection at the first port to the core network, detect a failure of the connection at the first port to the core network, and modify, in response to the detected failure of the connection at the first port, the spanning tree protocol priority value to a value having a lower priority than that of a second device in the spanning tree, where the second device connects to the core network.

In another implementation, a system may include a first edge device to connect to a core network and a second network; and a second edge device to connect the core network and the second network, where, at a given time, only one of the first and second edge devices connect the core network and the second network. The first edge network device may include: a first memory to store a first spanning tree protocol priority value for the first edge device; a second memory to store a second spanning tree protocol priority value for the first edge device, where the second spanning tree protocol priority value is of a lower priority than the first spanning tree protocol priority value; logic to monitor the connection of the first edge device to the core network; logic to detect a failure of the connection of the first edge device to the core network; and logic to set a spanning tree priority value of the first edge device as equal to the second spanning tree priority value when a failure of the connection of the first edge device to the core network is detected.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers in different drawings may identify the same or similar elements. Also, the following detailed description does not limit the invention.

Techniques for improving the reliability of the connection of a customer edge (CE) device to a core network are described herein. A CE device may be multi-homed to two or more redundantly arranged provider edge (PE) devices. The PE devices may connect the CE device to the core network. When the connection from the active PE device to the core network fails, the active PE device may modify its spanning tree protocol (STP) priority value to a value that is a lower priority than the priority of the backup PE device. By operation of the STP protocol, traffic will begin to flow between the CE device and the previous backup PE device. In this manner, traffic may be switched away from the path of the failed connection. Advantageously, the traffic switching may be performed without modification to the CE device and without modification to the communication protocols used by the PE devices and the CE device.

In the description that follows, networked devices will be described as communicating packets of data. Other fixed length or variable length units of data could alternatively be used.

System Overview

Figure 1:
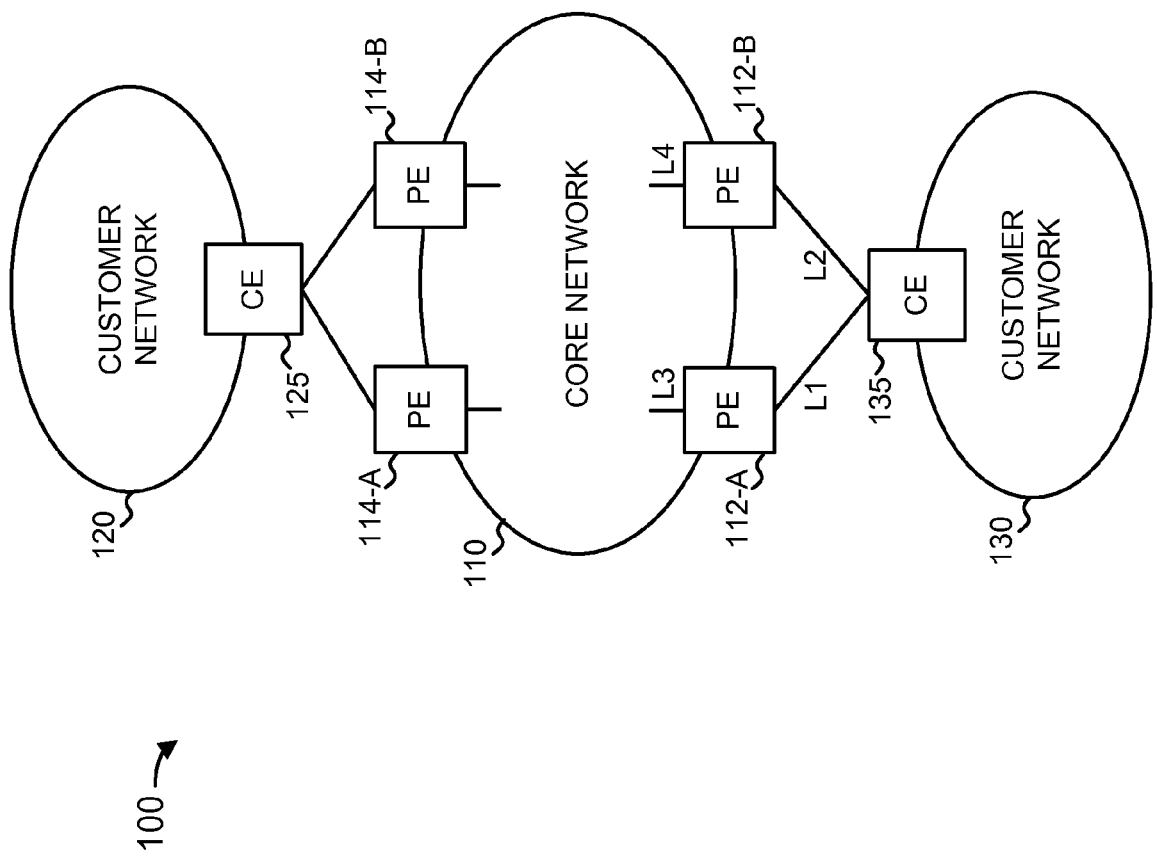
FIG. 1 is a diagram of an example environment in which concepts described herein may be implemented.

FIG. 1 is a diagram of an exemplary environment 100 in which concepts described herein may be implemented. System 100 may include a core network 110, which may connect to one or more additional networks or devices, illustrated as customer networks 120 and 130.

Core network 110 may include one or more types of networks. For instance, core network 110 may include a wide area network (WAN), a local area network (LAN) a network based on fiber optic connections, or a network based on wireless connections. In one implementation, core network 110 may be a high-bandwidth WAN, such as a network implemented by a network service provider and designed to provide network connectivity over large areas. Core network 110 may be implemented using a number of network devices, such as routers, switches, bridges, and other network devices. Core network 110 may additionally include connections between the network devices, such as fiber connections, wireless connections, coaxial connections, or twisted pair copper cabling.

The network devices that are used to implement core network 110 are particularly shown as including provider edge (PE) devices 112-A, 112-B, 114-A, and 114-B. PE devices 112-A, 112-B, 114-A, and 114-B may include, routers, switches, or other network devices designed to provide connectivity to core network 110. In one implementation, PE devices 112 and 114 may particularly include provider edge routers. Core network 110 may include a network managed by a network provider and PE devices 112-A, 112-B, 114-A, and 114-B may be used to connect core network 110 to customers of the network provider. A single customer may, for example, maintain customer networks 120 and 130. Core network may provide a bridge between customer networks 120 and 130 to connect these two networks.

When acting as a bridge between customer networks 120 and 130, core network 110 may particularly be used to provide provider backbone bridging and may implement a provider bridge network (PBN), a provider backbone bridge network (PBBN), or a virtual private LAN service (VPLS). In this situation, provider backbone bridging may be used to connect and inter-operate core network 110 with customer networks 120 and 130.

Customer networks 120 and 130 may each include one or more types of networks. For instance, customer networks 120 and 130 may each include a wide area network (WAN) or a local area network (LAN). In one implementation, customer networks may include two LANs that are geographically distributed. Customer networks 120 and 130 may connect to one another by using core network 110 as a bridge.

Customer network 120 may include customer edge (CE) device 125. Customer network 130 may similarly include CE device 135. CE devices 125 and 135 may include, for example, routers, switches, and/or other network devices that are used to connect customer networks 125 and 130 to one another over core network 110.

A number of links are labeled in FIG. 1. In particular, the connections between CE device 135 and PE device 112-A is labeled as link L1; the connection between CE device 135 and PE device 112-B is labeled as link L2; the connection from PE device 112-A to core network 110 is labeled as link L3; and the connection from PE device 112-B to core network 110 is labeled as link L4.

Although a single CE device 125 or 135 is illustrated as connecting customer networks 120 or 130 to core network 110, in some implementations, multiple CE devices may connect each customer network to core network 110. In this case, both CE devices may be dual-homed to different PE devices.

FIG. 1 shows examples of components that may be included in environment 100. In other implementations, environment 100 may include fewer, different, differently arranged, or additional components than depicted in FIG. 1. Alternatively, or additionally, one or more components of environment 100 may perform one or more tasks described as being performed by one or more other components of environment 100.

Example Device Architecture

Figure 2:
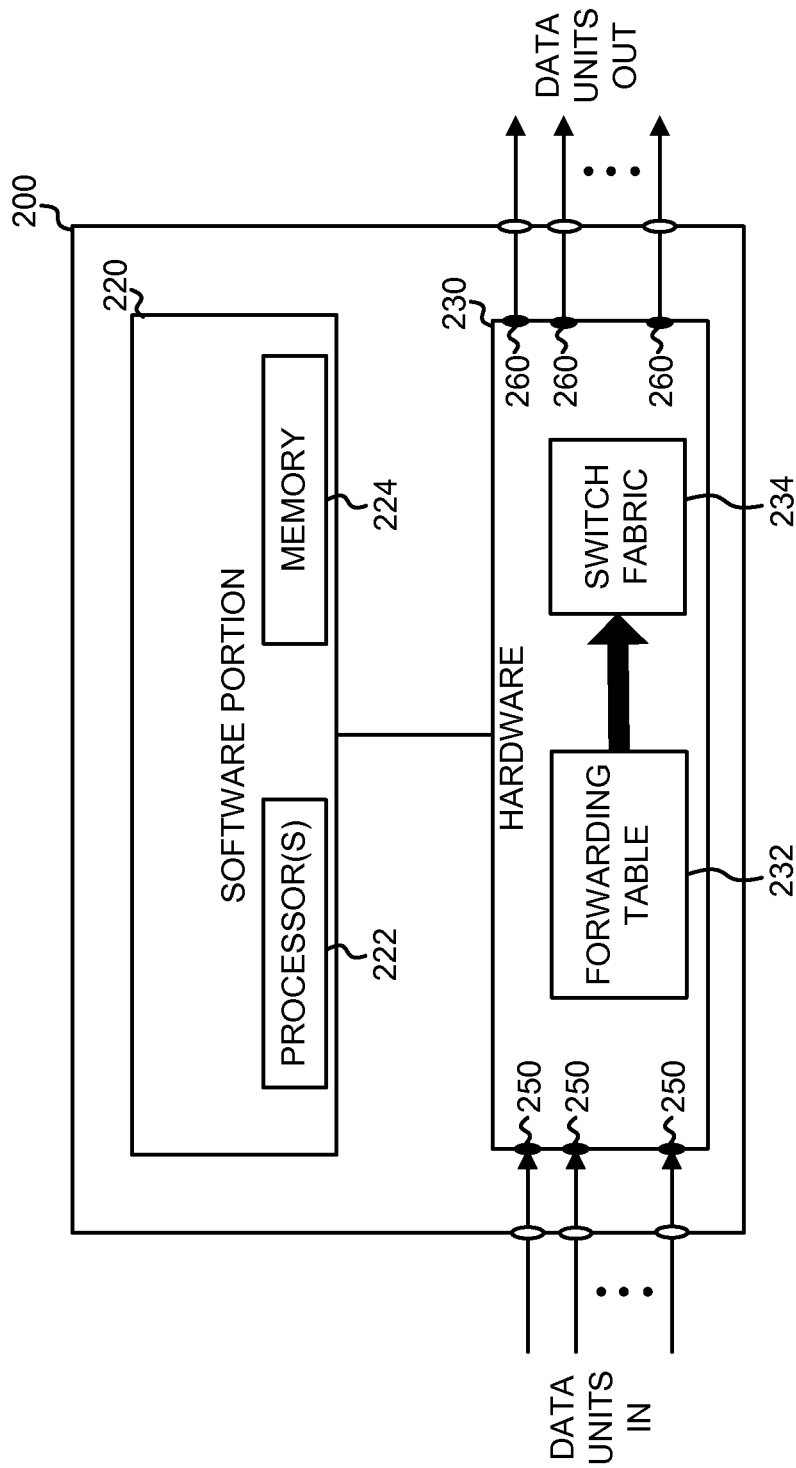
FIG. 2 is a diagram illustrating an example device which may correspond to one of the devices shown in FIG. 1.

FIG. 2 is a diagram illustrating an example device 200, which may correspond to one of CE devices 125, 135, or one of PE devices 112-A, 112-B, 114-A, or 114-B.

As shown in FIG. 2, device 200 may include a software portion 220 and a hardware portion 230. Software portion 220 may include software designed to control device 200. Software portion 220 may, for example, implement an operating system for device 200 and may execute processes designed to implement the network protocols used by device 200. Software portion 220 may control hardware portion 230 and provide an interface for user configuration of device 200. In general, software portion 220 may implement the functions of the device 200 that are either related to control or that can be implemented in the "slow path" through device 200. Software portion 220, although shown as a single abstract block 220 in FIG. 2, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memory (RAM), read-only memory (ROM), and/or another type of dynamic or static storage device that may store information and instructions for execution by processors 222.

Hardware portion 230 may include circuitry for efficiently processing packets received by network device 200. Hardware portion 230 may include, for example, logic, such as an application specific integrated circuit (ASIC), a field programmable gate array (FPGA), and/or a ternary content-addressable memory (TCAM). Hardware portion 230 may, for example, receive incoming packets, extract header information for the packets, and process the packets based on the extracted header information.

Hardware portion 230 may particularly include a forwarding table 232 and a switch fabric 234. Forwarding table 232 may be used to lookup the appropriate output port for incoming packets. Forwarding table 232 may be updated based on the network protocols implemented by software portion 220. Based on the result of the lookup in forwarding table 232, the packet may be switched to the appropriate output port through switch fabric 234.

Device 200 may also include ports for receiving and transmitting packets. A number of input ports 250 and output ports 260 are particularly shown for device 200. Packets received at one of input ports 250 may, based on the application of forwarding table 232 and switch fabric 234, be output at an appropriate one or more of output ports 260.

It can be appreciated that although device 200 is shown as including a software portion 220 and a hardware portion 230, device 200 may, in some implementations, be implemented entirely through hardware. In some implementations, device 200 may include fewer, different, differently arranged, or additional components than depicted in FIG. 2. Alternatively, or additionally, one or more components of device 200 may perform one or more tasks described as being performed by one or more other components of device 200.

Device Operation

Devices in environment 100, such as PE devices 112, 114 and CE devices 125, 135, may implement the spanning tree protocol (STP). In general, STP is a known link layer network protocol that ensures a loop-free topology for bridged networks. A "loop" may result when multiple active paths are present between nodes in a network, which may result in packets continuing to undesirably circulate in a loop. The STP protocol may prevent loops by detecting loops and blocking certain ports to prevent loops.

The collection of network devices (e.g., bridges), such as the group of network devices in a LAN, can be considered a graph whose nodes are the network devices and in which the edges of the graph are defined by the segments (e.g., links) connecting the nodes to one another. To break loops in the LAN while maintaining access to all LAN segments, the nodes can collectively compute a spanning tree. The computed spanning tree may be altered by an administrator by altering configuration parameters of the spanning tree.

Figure 3:
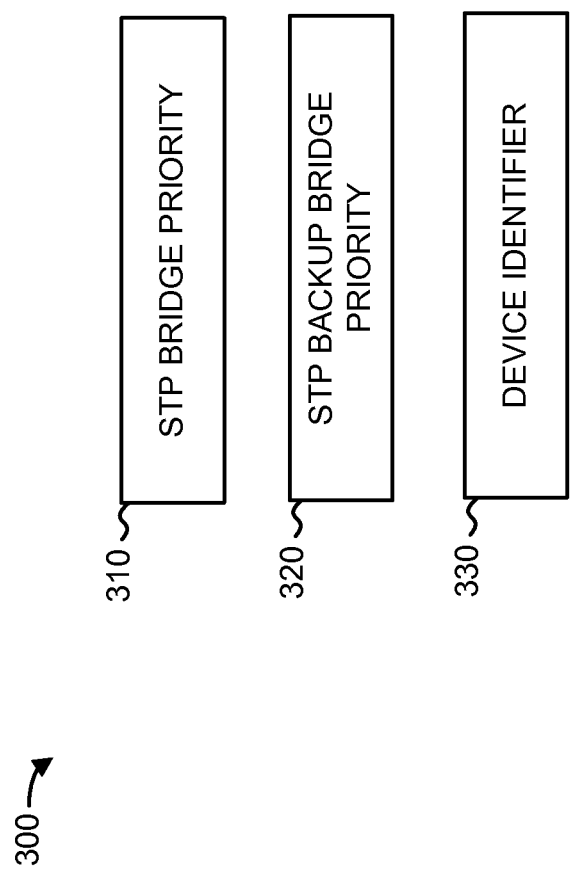
FIG. 3 is a diagram illustrating an example data structure stored by one of devices 112 or 114, as shown in FIG. 1.

FIG. 3 is a diagram illustrating an example data structure 300 in one of PE devices 112-A, 112-B, 114-A, or 114-B. Data structure 300 may be stored, for example, in memory 224 or encoded in hardware 230. Data structure 300 may store configuration parameters, for a device, relating to a spanning tree.

Data structure 300 may include STP bridge priority field 310, STP backup bridge priority field 320, and bridge identifier 330. STP bridge priority field 310 may store the priority value that is normally used by the device for the STP. Lower numeric values stored in STP bridge priority field 310 may indicate higher priority under the STP.

STP backup bridge priority field 320 may store a second priority value. The second priority value may be a value that is higher than (i.e., has a lower priority than) the value stored in STP bridge priority field 310. The priority value in STP backup bridge priority field 320 may be set as the active priority value when customer's device's connection to core network 110 fails.

Device identifier field 330 may include a unique identifier assigned to the device. In one implementation, device identifier field 330 may correspond to the location of the media access control (MAC) address of the device.

FIG. 3 shows examples of a data structure 300 that may be implemented by a device. In other implementations, data structure 300 may include fewer, different, differently arranged, or additional fields than depicted in FIG. 3.

Devices implementing the STP protocol may select a "root" device for the spanning tree based on a priority value, such as the value in STP bridge priority field 310, and device identifier value, such as the value of device identifier field 330, assigned to each device implementing the STP. The root device may be selected as the device with the highest priority (i.e., lowest numerical priority value). If multiple devices have an equal priority value, the device with the lower device identifier value may be assigned as the root device. Depending on the state of the device, the priority value for the device may be equal to the value stored in either STP bridge priority field 310 or STP backup bridge priority field 320. The device identifier may be equal to the value of device identifier field 330.

Figure 4:
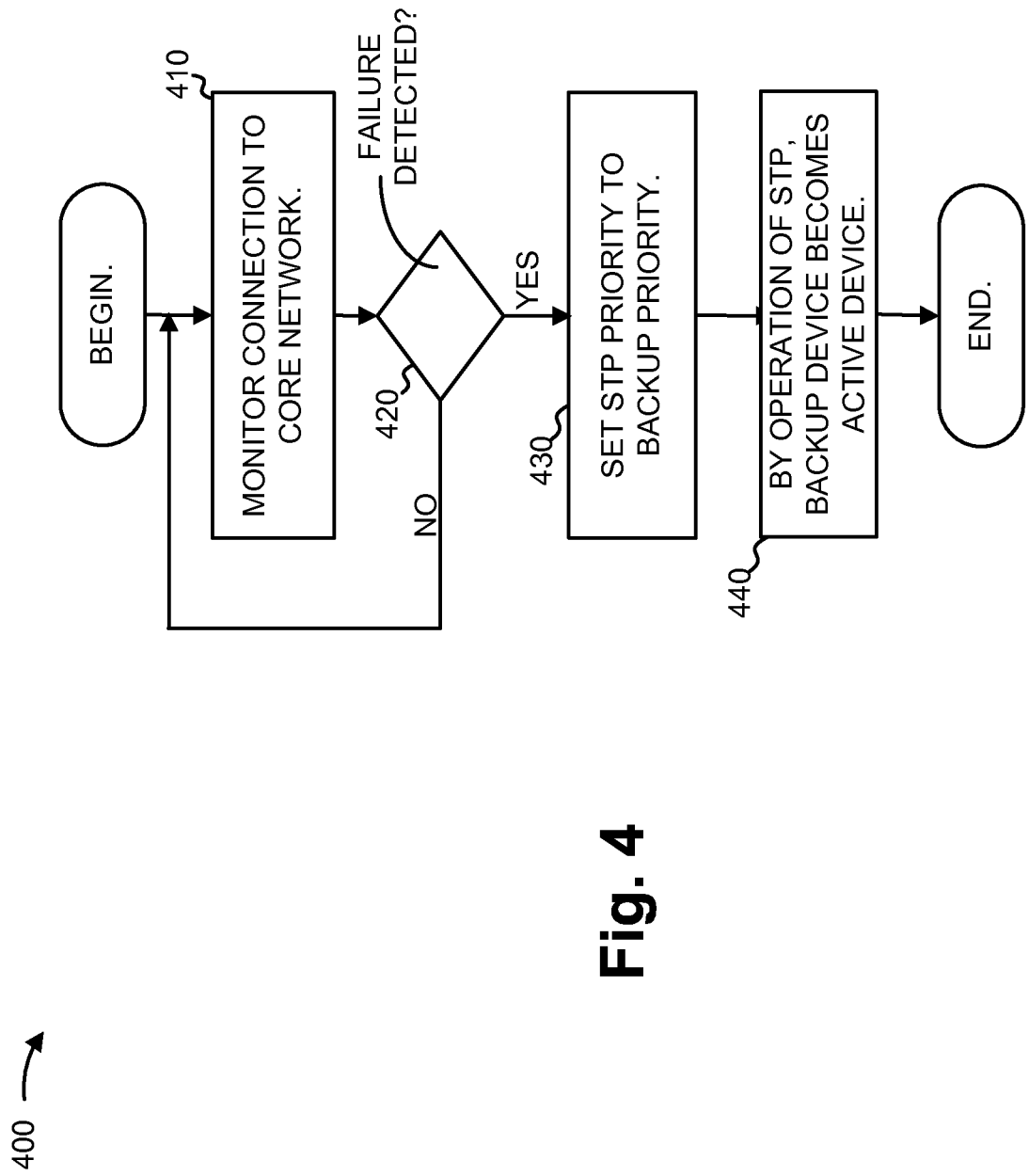
FIG. 4 is a flow chart illustrating an example of a process for switching between active devices that provide access to a core network.

FIG. 4 is a flow chart illustrating an example of a process 400 for switching between active devices that provide access to core network 110. For process 400, assume that in system 100, a CE device, such as CE device 135, is multi-homed to two PE devices, such as PE devices 112-A and 112-B. PE devices 112 may provide a redundant connection for CE device 135 to core network 110, which may implement a PBN that connects customer network 120 to customer network 130. Assume PE device 112-A is initially the active device and PE device 112-B is initially the backup device. That is, for the backup device, PE device 112-B, link L2 may not be used, such as by blocking (e.g., due to the operation of a root protection technique), the port at PE device 112-B to CE device 135. Process 400 may be performed by the active PE device.

In normal operation, PE device 112-A and PE device 112-B may both be set so that the STP bridge priority of these devices is set equal to the value stored in STP bridge priority field 310. In one implementation, these STP bridge priority values may be set to be equal to one another. Alternatively, the STP bridge priority values may be smaller than the STP backup bridge priority values but not equal to one another.

During normal operation of the bridge connecting customer network 130 to customer network 120, only one of links L3 and L4 may be active to core network 110 at a time. This may be performed by, for example, using a root protection technique in which root ports that receive superior spanning tree protocol data units (PDUs) are placed in a root-prevented STP state and the corresponding interface may be blocked. This may prevent a device that should not be the root device from being elected the root device. After the device with root-protect enabled stops receiving superior PDUs on the port with the root protect enabled and the received PDUs time out, the port may be transitioned back to an STP designated port state. Another technique that may be used to ensure that only one of links L3 and L4 are active to core network 110 at a time may include, for example, a technique in which a Layer 2 gateway protocol is implemented at CE device 135.

Process 400 may include monitoring the connection to core network 110 (e.g., link L3) (block 410). PE device 112-A may, for example, monitor the connection to core network 110 for physical failure of the links to core network 110, such as a failure due to a cable being cut or disconnected, and for failures of network devices upstream of PE device 112-A, such as a failure of a switch or router to which link L3 is connected in core network 110. Monitoring the connection to core network 110 may be performed in software, hardware, or a combination of hardware or software. Each port of PE device 112-A may include, for example, circuitry to detect when no data is received at the port over a predetermined time period.

When a connection failure is detected (block 420—YES), PE device 112-A may set its STP bridge priority value to be equal to the backup priority value (block 430), such as the value stored in STP backup bridge priority field 320. As previously mentioned, the backup priority value may be a lower priority (i.e., higher numerical value) than the STP bridge priority of the backup PE device (PE device 112-B). Thus, the relative priority values of PE device 112-A and 112-B are effectively inverted.

By inverting the relative STP priority values of PE devices 112-A and 112-B, through operation of the normal STP protocol, PE device 112-B will become the active PE device (block 440). More particularly, because of the change in priority values, PE device 112-B will be the root device of the spanning tree. To avoid loops, the interface from CE device 135 to PE device 112-A (the interface corresponding to link L1) may be blocked and the interface from CE device 135 to PE device 112-B (the interface corresponding to link L2) will become active for customer network 130.

Through the operation of process 400, a CE device can be multi-homed to a number of PE devices to provide redundant connectivity to core network 110. In the event of a failure of the connection to the core network from active PE device 112-A, active PE device 112-A can initiate a switchover to one of the other PE devices by changing its STP priority value. Advantageously, redundant connectivity to the core network can be provided without changing CE device 135 and without requiring the implementation of additional or modified protocols.

Figure 5:
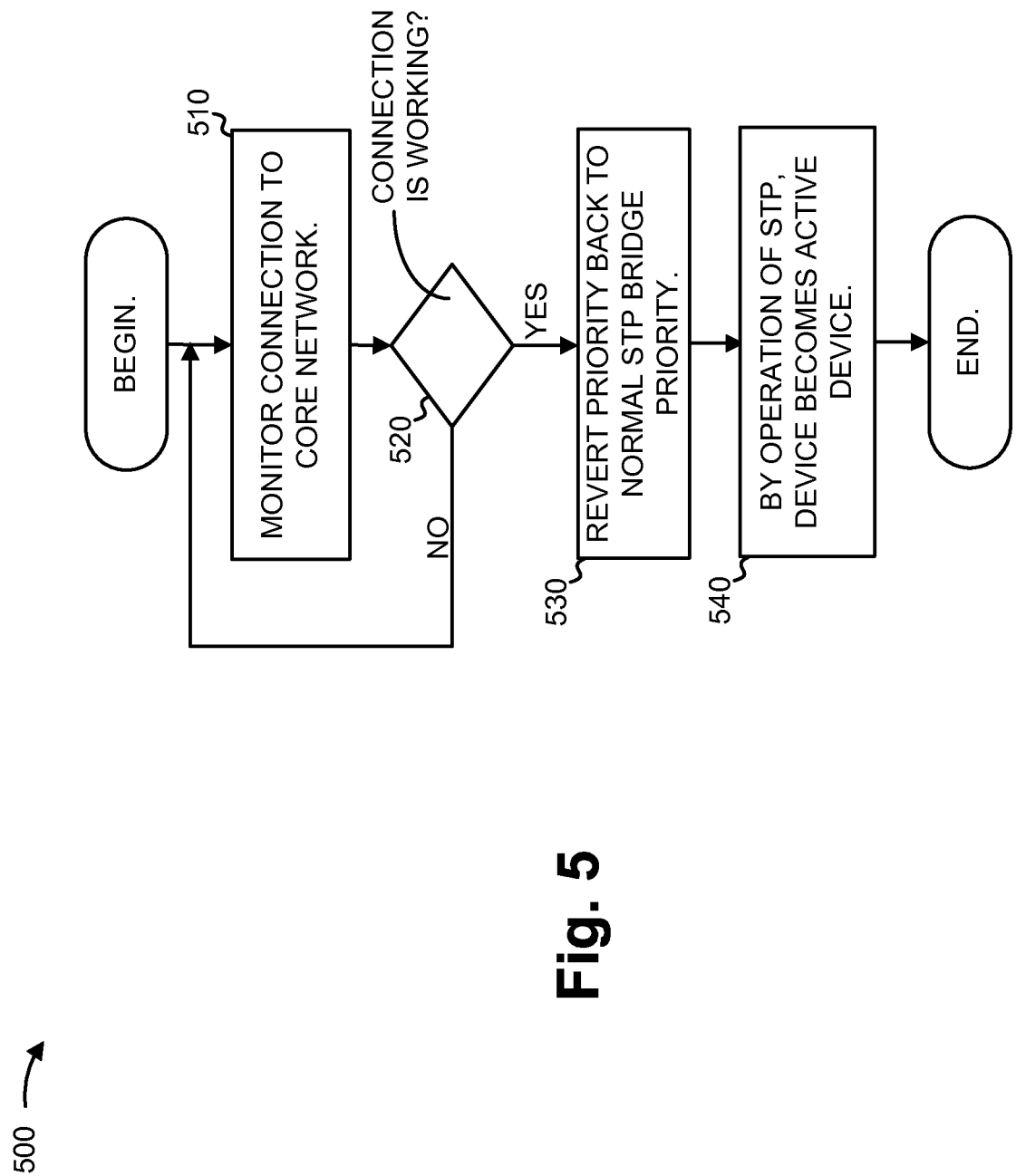
FIG. 5 is a flow chart illustrating an example of a process for switching a previously active device back to an active device.

FIG. 5 is a flow chart illustrating an example of a process 500 for switching a previously active device back to an active device. For process 500, assume that in system 100, process 400 has been performed in response to PE device 112-A losing connectivity to core network 110. PE device 112-B is now the active PE device. Process 500 may be performed by a PE device that has lost connectivity, such as PE device 112-A.

Process 500 may include monitoring the connection to core network 110 (e.g., link L3) (block 510). PE device 112-A may, for example, monitor the connection, as previously discussed, to detect whether the connection begins working again.

When the connection is detected to be working (i.e., the connection failure has ceased) (block 520—YES), PE device 112-A may revert its STP bridge priority value back to the normal priority value (block 530), such as the value stored in STP bridge priority field 310. The priority value of PE device 112-A may now be equal to the priority value of PE device 112-B. In the STP protocol, when selecting a root device, two devices that have equal priorities may be selected based on their device identifier values, such as the values corresponding to device identifier field 330. In this case, assume that PE device 112-A is selected over PE device 112-B based on this value.

In some implementations, before reverting its STP bridge priority value back to the normal priority value, PE device 112-A may delay for a predetermined hold interval to ensure that the previous change to the backup value has propagated through the spanning tree Through operation of the normal STP protocol, PE device 112-A may again become the active PE device (block 540). More particularly, because of the change in priority values, PE device 112-A may be selected as the root device of the spanning tree. To avoid loops, the interface from CE 135 to PE 112-B (the interface corresponding to link L2) may be blocked and the interface from CE device 135 to PE device 112-A (the interface corresponding to link L1) will become active for customer network 130.

Figure 6B:
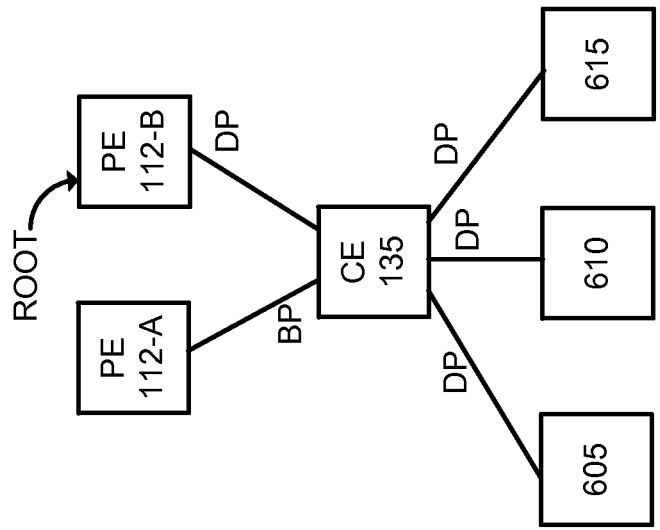
FIGS. 6A and 6B are diagrams illustrating examples of a collection of network devices implementing the spanning tree protocol and performing the operations discussed previously with respect to FIGS. 4 and 5.
Figure 6A:
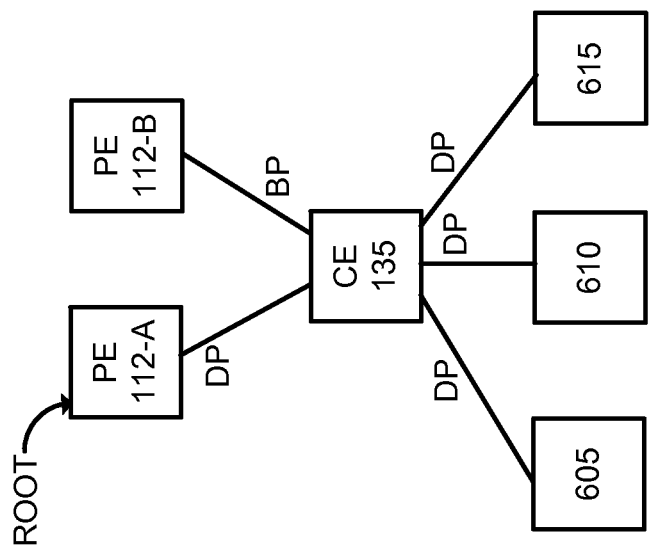

FIGS. 6A and 6B are diagrams illustrating examples of a collection of network devices implementing the spanning tree protocol and performing the operations discussed previously with respect to FIGS. 4 and 5. Six devices, implementing a spanning tree, are shown in each of FIGS. 6A and 6B. PE devices 112-A and 112-B, and CE device 135 correspond to the same devices shown in FIG. 1. Additionally, network devices 605, 610, and 615 are connected to CE device 135. Each of network devices 605, 610, and 615 may correspond to, for example, a switch, a server, or another network device that may connect to other networks through CE device 135.

In FIG. 6A, the state of the illustrated devices is shown during normal operation. As shown, PE device 112-A is selected as the root device under the spanning tree protocol. PE devices 112-A and 112-B may have identical STP priority values. PE device 112-A may be chosen as the root device over PE device 112-B based on its device identifier. Under STP, after devices in the spanning tree choose a root device, each device may determine the cost of each possible path from itself to the root. The smallest cost path is designated the root port of the device. The paths corresponding to root ports are illustrated in FIG. 6A as designated ports (DP). Under STP, and due to the root protect feature, the port from CE device 135 to PE device 112-B will be a root port that is a blocked port (BP) and will not be used to bridge data traffic.

In FIG. 6B, the state of the illustrated devices is shown after a failure of the connection from PE device 112-A leading to core network 110. As discussed with respect to process 400, the failure of this connection may cause PE device 112-A to change its STP bridge priority to be less than PE device 112-B. As a result, PE device 112-B may become the designated root port. Under STP, the port from CE device 135 to PE device 112-A will be designated as a blocked port and will not be used to bridge data traffic.

CONCLUSION

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIGS. 4 and 5, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   monitoring, by a first device, a connection to a core network, the first device acting as a root device of a set of devices that implement a spanning tree using a spanning tree protocol, and a second device, of the set of devices, being connected to the core network;

detecting, by the first device, a failure of the connection of the first device to the core network; and changing, by the first device and based on detecting the failure of the connection, a first priority value of the first device from a first numerical value to a second numerical value, a second priority value of the second device being equal to the first numerical value before and after changing the first priority value of the first device, the second numerical value being associated with a priority lower than a priority associated with the first numerical value, changing the first priority value causing, by operation of the spanning tree protocol, the second device to act as the root device of the spanning tree, and data communicated with the core network being communicated through the second device when the second device acts as the root device in the spanning tree.

2. The method of claim 1, where the core network includes a provider bridge network or a provider backbone bridge network.

3. The method of claim 1, where the first device includes an edge router.

4. The method of claim 1, where the failure of the connection includes:
a physical failure of a link to the core network, or
a failure of an upstream network device to which the first device is connected.

5. The method of claim 1, further comprising:
detecting that the connection to the core network has begun working after detecting the failure of the connection; and
reverting, based on detecting that the connection has begun working, the first priority value to the first numerical value from the second numerical value.

6. The method of claim 5, further comprising:
delaying for a particular interval before reverting the first priority value to the first numerical value.

7. The method of claim 1, further comprising:
implementing root protection at the first device and at the second device,
the root protection preventing the first device and the second device from simultaneously acting as the root device under the spanning tree protocol.

8. A first device comprising:
a plurality of ports,
a particular port, of the plurality of ports, connecting to a core network, and
the first device acting as a root device of a set of devices that implement a spanning tree using a spanning tree protocol;
a memory to store a first priority value for the first device; and
one or more processors to:
monitor a connection at the particular port to the core network,
detect a failure of the connection at the particular port to the core network, and
modify, based on detecting the failure of the connection at the particular port, the first priority value from a first numerical value to a second numerical value, a second priority value of a second device, of the set of devices, being equal to the first numerical value before and after modifying the first priority value of the first device, the second numerical value being associated with a priority lower than a priority associated with the first numerical value, and modifying the first priority value causing the second device to act as the root device.

9. The first device of claim 8, where data communicated with the core network is communicated through the second device when the second device acts as the root device.

10. The first device of claim 8, where the core network includes a provider bridge network or a provider backbone bridge network.

11. The first device of claim 8, where the first device includes an edge router.

12. The first device of claim 8, where the failure of the connection at the particular port includes one of:
a physical failure of a link to the core network, or
a failure of an upstream network device to which the first device is connected.

13. The first device of claim 8, where the one or more processors are further to:
detect that the connection to the core network has begun working; and
revert, based on detecting that the connection has begun working, the first priority value to the first numerical value from the second numerical value.

14. The first device of claim 13, where the one or more processors are further to:
delay for a particular interval before reverting the first priority value to the first numerical value.

15. The first device of claim 8, where the one or more processors are further to:
cause root protection to be implemented at the first device and at the second device,
the root protection preventing the first device and the second device from simultaneously acting as the root device.

16. A system comprising:
a first edge device to connect a core network; and
a second edge device to connect the core network,
the first edge device being to:
monitor a connection of the first edge device to the core network,
detect a failure of the connection of the first edge device to the core network, and
change a first priority value of the first edge device from a first numerical value to a second numerical value after detecting the failure of the connection,
a second priority value of the second edge device being equal to the first numerical value before and after changing the first priority value of the first device,
the second numerical value being associated with a priority lower than a priority associated with the first numerical value, and
changing the first priority value to the second numerical value causing the second edge device to act as a root device under a spanning tree protocol.

17. The system of claim 16, where data communicated with the core network is communicated through the second edge device when the second edge device acts as the root device.

18. The system of claim 16, where the core network includes a provider bridge network or a provider backbone bridge network.

19. The system of claim 16, where when, detecting the failure of the connection, the first edge device is to:
  detect the failure of the connection based on a physical failure of a link to the core network or a failure of an upstream network device to which the first edge device is connected.

20. The system of claim 16, where the first edge device is further to:
  detect that the connection has begun working, and
  revert, after detecting that the connection has begun working, the first priority value to the first numerical value from the second numerical value.

21. The system of claim 16, where at least one of the first edge device and the second edge device includes:
  logic to prevent the first edge device and the second edge device from simultaneously acting as the root device under the spanning tree protocol.

22. The system of claim 16, where the second numerical value is higher than the first numerical value.

* * * * *